Aug. 2, 1955 S. W. McKENDREE 2,714,222
FEATHER PLUCKING DEVICE
Filed April 5, 1954

INVENTOR.
Scott W. McKendree
BY
Atty.

2,714,222
FEATHER PLUCKING DEVICE

Scott W. McKendree, Klamath Falls, Oreg., assignor to McKendree Products Co., Klamath Falls, Oreg., a corporation of Oregon Application April 5, 1954, Serial No. 421,106

6 Claims. (Cl. 17—11.1)

My invention relates to improvements in apparatus for plucking feathers from fowl, and particularly for dry-picking waterfowl, such, for example, as ducks.

Many types of feather picking wheels and devices have been devised for removing feathers from scalded fowl, such, for example, as chickens. Such devices are impractical for waterfowl because when waterfowl are scalded, the oil ducts tend to excrete oil upon the feathers and, thereafter, they can be removed only with great difficulty. At the present time, hand-picking of waterfowl is the only practical solution. Various dips have been devised, such, for example, as waxes which are solid at atmospheric temperatures. These are heated and form a rather free-flowing fluid. When they cool, they form an encasement about a duck which flows about and embeds the feathers therein.

The usual method of hand-plucking ducks is by the use of the balls of the thumbs, which are rubbed over the feathers to withdraw them from the skin of the ducks. Great care must be taken to see that too much pressure is not exercised because it would tend to break the skin. Too vigorous rubbing of the feathers also tends to produce excretion from the oil containing glands immediately under the skin of a waterfowl, which excretion covers the feathers, and particularly the downy undercoat, and thereafter said feathers and undercoat can be removed only with great difficulty and danger of breaking the skin.

I have discovered that if a rubber wheel is provided with a series of frusto-conic projections thereon, such a wheel will comb the feathers into small bundles and will pull them from the skin without breaking the skin and without producing an undue excretion of oil from the skin glands. Said wheel and the projections thereon must be resilient and flexible. The projections must be spaced apart sufficiently to enable each projection in a row to act independently and not overlie the adjacent projections, either laterally or peripherally of the wheel. With such type of plucking wheel, I am able to remove feathers quickly, cleanly, and without injury to a dressed fowl. Said device also removes the downy undercoat and pinfeathers and is of such size that it can be manipulated about the fowl's legs and wings.

Other and further details of my invention are hereinafter described with reference to the accompanying drawings, in which.

Figure 1:
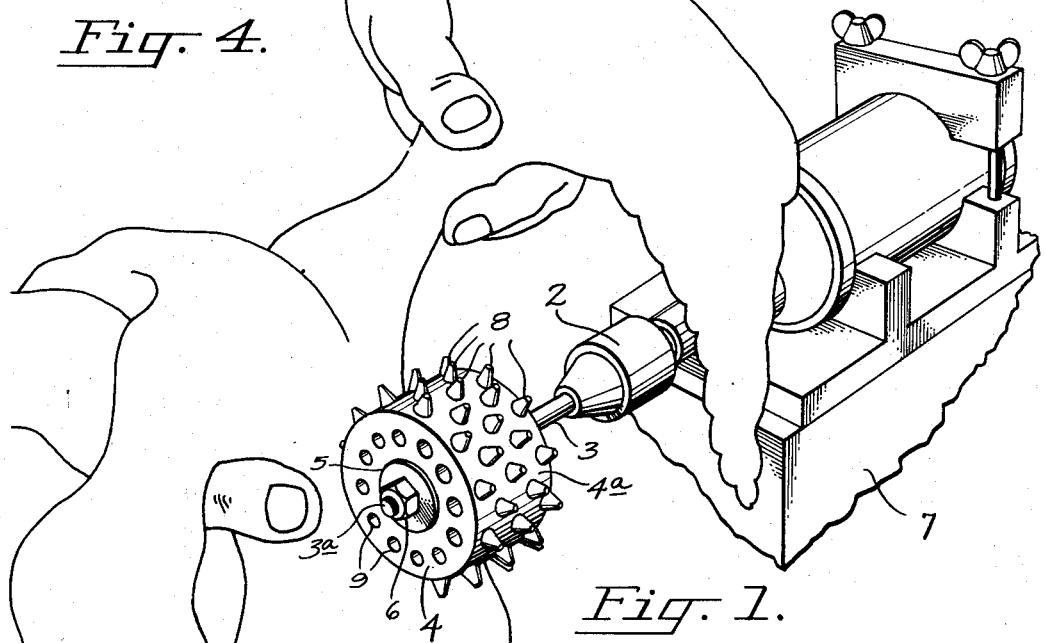
Fig. 1 is a perspective view of a waterfowl having its breast portion picked by a device embodying my invention.

My invention is adapted to be used with a small, portable motor, such, for example, as the electric drill shown in Fig. 1. Such drills are normally provided with a chuck 2, into which the spindle 3 of my device may be secured. Said spindle is approximately the same diameter as that of the shank of a drill, and has secured to one end thereof a molded rubber drum member 4 of cylindrical form. Said drum is secured between a pair of spaced washers 5 secured to said spindle by means of a threaded nut 6 mounted upon the threaded end 3a of said spindle. There is another nut or shoulder 6a on the far side of said drum against which said drum is pressed between the washers by the threading of said nut 6 upon the threaded end 3a of the spindle.

Said electric drill is preferably bolted down upon a bench or table 7 with the drum 4 extending over one edge thereof. Thus, a duck may be held, as indicated in Fig. 1, either below the wheel or above the wheel, and the feathers beneath the wings, legs, around the neck, and about the body may be easily and cleanly plucked therefrom. When the wheel is thus mounted at the end of a shaft or spindle, it presents one free side which does not interfere with the free use thereof; that is, the side of the rubber drum member 4 spaced from the bench or table 7 has no shaft extending therethrough which would interfere with the free manipulation of a duck about this side of said wheel.

Although my invention is adapted for various size drums, I have found that one approximately 2 7/16 inches in diameter and 1 1/2 inches broad is particularly usable in connection with ducks. Across the peripheral face 4a of said drum is a series of spaced protuberances or projections 8. They are arranged in lateral rows, as well as in peripheral rows, about said peripheral face 4a. With this size drum, I preferably make said protuberances or projections of frusto-conic shape. They are about 5/16 inch long with a 1/4 inch base and the tops are about 1/16 inch across. Said protuberances are integral with the remainder of said wheel or drum and are preferably made of rubber having a durometer reading of between 30 and 35. This texture of the rubber provides a relatively resilient drum and the protuberances yield comparably to the yield of a person's thumb when plucking a bird. The yield, resilience or elasticity thus provided pulls feathers from the skin without abrading the latter or rubbing the skin to exude the oil from the oil glands which lie immediately adjacent the surface thereof.

Figure 4:
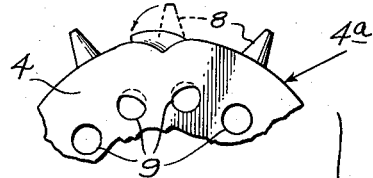
Fig. 4 is a fragmentary end view, illustrating the manner in which one of the projections lies with its face against the periphery of the drum when lateral pressure is applied thereto.

Said projections 8 are arranged so that there is slightly more than 5/16 of an inch lying between them and those lying immediately adjacent. Thus, said projections, due to their resilience, may be bent to lie flatwise upon the peripheral surface of the drum, as is illustrated in Fig. 4, without abutting or overlying any of the adjacent protuberances. Said drum also is provided with a series of transverse apertures 9, which lie inwardly of the peripheral face 4a a distance of about 1/4 inch. Thus, said apertures lie inwardly from said surface a distance comparable to the spacing of the protuberances about said face.

Figure 3:
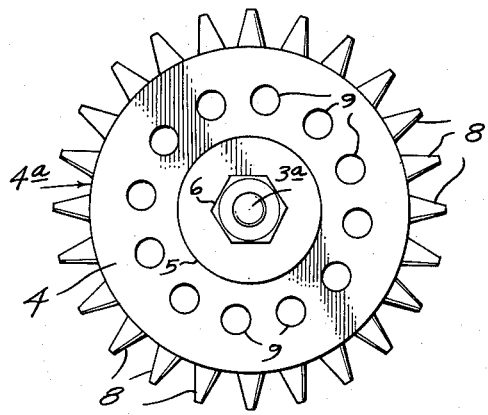
Fig. 3 is an end view of said picking wheel.
Figure 2:
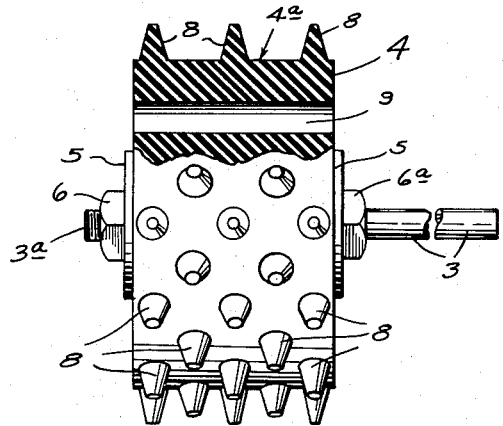
Fig. 2 is an edge view of said picking wheel, with the spindle portion thereof shown foreshortened and the wheel and the protuberances thereon shown broken away to illustrate structural details thereof.

As is apparent, particularly in Fig. 3, said apertures are spaced radially about said drum member so that they lie between alternate transverse rows of protuberances. I deem this quite important because it makes said drum yield when pressure is applied to flatten the protuberances, so that they lie flatwise upon the peripheral surface of the drum. As is apparent in Fig. 4, said apertures are flattened and distorted and the entire drum yields from the tip of each protuberance more or less throughout the entire radial dimension of the drum down to the marginal rim of the washers 5.

My device operates substantially as follows:

A picking wheel fixed to its spindle and held in the chuck of an electric drill or other motor driven appliance is secured to a bench or table, as is illustrated. Preferably, such a duck picking device should be operated in a room or compartment where there is little draft, and experience has demonstrated that approximately ninety per cent of the feathers will fall in a three foot square directly under the picking head, and very few will be thrown more than six feet from the machine.

Thus, a sheet or a piece of canvas may be spread on the floor to catch the feathers. A duck picking device embodying my invention is designed to fit any power unit which has a quarter inch or larger drill chuck. This includes almost all small, portable electric drills. Of course, such spindle may be driven by a larger electric drill, or by any other motor such as a gasoline engine, or may be chucked to the end of any power driven shaft.

I deem it important that said picking wheel should rotate counter-clockwise when facing the end of the chuck; that is, when standing and looking at the picker wheel, as viewed in Fig. 3. When said wheel is rotated in this manner, it will tend to stay tight on its spindle when a right hand threaded connection is made. I have found that a motor which generates about 1/7 horse power is sufficient, and it may be driven at any speeds between 600 and 2,000 revolutions per minute. Said power unit should be fastened solidly to a table or bench, and as has been pointed out, should extend out from the edge thereof horizontally. In picking a duck, it is most conveniently done by standing with the wheel directly in front of the operator and holding the duck by the neck with the left hand, with the right hand arranged underneath the body of the duck, bringing the duck up against the picker head. I deem it best practice to start picking the back of the duck with a short sidewise motion. Only sufficient pressure should be applied to remove the feathers; that is, only sufficient pressure should be applied to pick the ducks because further pressure will tend to tear the skin. If the duck is applied to the picking wheel with the duck above the wheel, it will tend to scatter feathers and also will interfere with the vision of the operator. Sometimes it is desirable to pull a few of the larger feathers by hand, especially around the duck's tail. Thereafter, the bird may be manipulated so that the duck-picking head reaches all parts and the bird can be picked completely clean, including the body, the wings, the areas under the wings and the legs. The wings require more pressure than do other parts of the bird in order to remove the feathers and down from the leading edge toward the trailing edge.

It has been my experience that a duck picking wheel embodying my invention can pick a Mallard duck in five or six minutes. The work is cleanly done, including removal of the down undercoat. With a drum having a durometer reading of from 30 to 35, a great deal of accommodation is present before the duck's skin will be broken. This is due to the fact that the entire picking wheel tends to yield from the tip of the protuberances down toward and through the body of the drum. This provides a yielding application of force. First the protuberances may bend until they lie flatwise against the peripheral surface of the drum. Simultaneously, the drum yields, as it is indicated in Fig. 4, and such resiliency applies sufficient pressure to pull the feathers without tending to break or abrade the skin, or without causing oil to be exuded from the oil glands lying closely beneath the duck's skin.

I claim:

1. A feather plucking device, comprising a molded rubbery drum member of cylindrical form having integral laterally and peripherally spaced projections extending radially out from the peripheral surface thereof, said drum member and radial projections being elastic to a degree that said projections will flex and lie flatwise with their sides bearing upon the peripheral surface of said member, said projections being arranged in circumferential rows about said periphery, with the projections in alternate rows aligned with each other and with the projections in intermediate rows lying medially thereof, said projections being of outwardly converging formation to define means for penetrating a mass of feathers and reaching to the skin of the fowl, said cylindrical drum member having transverse apertures formed therethrough, said apertures being spaced circumferentially of said cylindrical body in a circular course on intervals corresponding to the spacing of said projections in alternate ones of said circumferential rows upon the periphery of said body, and said apertures being aligned radially with the space between alternate rows of said circumferential projections about the periphery of the drum member.

2. In a portable feather plucking device for removing the feathers from a dry unscalded fowl, a molded rubbery drum member of cylindrical form having integral laterally and peripherally spaced projections extending radially out from the peripheral surface thereof, said drum member and radial projections being elastic to a degree that said projections will flex and lie flatwise with their sides bearing upon the peripheral surface of said member, said projections being arranged in circumferential rows about said periphery, with the projections in alternate rows aligned with each other and with the projections in intermediate rows lying medially thereof, said projections being of outwardly converging formation, said projections being spaced apart in said peripheral rows and laterally of the peripheral surface of the member so that when said projections are flexed under pressure and lie flatwise upon their sides, their tips approach but do not overlie the bases of adjacent projections, said cylindrical drum member having plural transverse circular apertures formed laterally therethrough, said apertures being spaced circumferentially of said cylindrical body in a circular course on intervals corresponding to the spacing of said projections in alternate ones of said circumferential rows upon the periphery of said body, said apertures being aligned radially with the space between alternate rows of said circumferential projections about the periphery of the drum member, said apertures also being spaced radially in from the outer periphery of said drum member a distance comparable to the spacing of said projections in the alternate circumferential rows about said peripheral surface.

3. A feather plucking device, comprising a rubbery drum member of cylindrical form having laterally and peripherally spaced projections extending radially out a uniform distance from its peripheral surface, said projections being spaced peripherally a distance at least as great as the length of the projections and said projections being of the same material as that of said drum, whereby when a projection is fully flexed it will lie with a side thereof bearing upon the peripheral surface of said drum member.

4. A device as defined in claim 3 modified in that said projections are of tapered and pointed conformation defining means for penetrating the overlying features of such bird and extending to the skin thereof to grip the feathers between adjacent pairs of projections and to pull them outwardly from the fowl's skin.

5. A device as defined in claim 3 modified in that said projections are of tapered pointed conformation and are arranged in circumferential rows thereby to comb the feathers lying between rows into bundled tufts before gripping them and pulling them outwardly from the fowl's skin.

6. A device as defined in claim 3 modified in that said drum member has transverse apertures formed therethrough, said apertures lying in a circular course spaced radially inwardly of the periphery of said drum member and said apertures being in predetermined spaced relation to the projections extending radially outwardly from said periphery.

References Cited in the file of this patent
UNITED STATES PATENTS

| | | |
|---|---|---|
| 874,251 | Schelling | Dec. 17, 1907 |
| 2,314,700 | Hanshaw | Mar. 23, 1943 |
| 2,456,757 | Valenta | Dec. 21, 1948 |
| 2,572,276 | Moe | Oct. 23, 1951 |
| 2,607,072 | Johnson | Aug. 19, 1952 |
| 2,610,633 | Jozwik | Sept. 16, 1952 |